US009805355B2

United States Patent
Renaldi et al.

(10) Patent No.: US 9,805,355 B2
(45) Date of Patent: Oct. 31, 2017

(54) METHOD AND SYSTEM HAVING A VIRTUAL STOCK KEEPING UNIT FOR CONFIGURABLE MOBILE PHONE PURCHASES

(71) Applicant: GOOGLE TECHNOLOGY HOLDINGS LLC, Mountain View, CA (US)

(72) Inventors: John A Renaldi, Park Ridge, IL (US); Ravi V Thakkar, Elk Grove Village, IL (US); James N Condos, Romeoville, IL (US)

(73) Assignee: GOOGLE TECHNOLOGY HOLDINGS LLC, Mountian View, CA (US)

( * ) Notice: Subject to any disclaimer, the term of this patent is extended or adjusted under 35 U.S.C. 154(b) by 454 days.

(21) Appl. No.: 13/900,692

(22) Filed: May 23, 2013

(65) Prior Publication Data
US 2014/0337152 A1    Nov. 13, 2014

Related U.S. Application Data

(60) Provisional application No. 61/822,815, filed on May 13, 2013.

(51) Int. Cl.
*G06Q 30/06* (2012.01)
*G06Q 20/20* (2012.01)
(Continued)

(52) U.S. Cl.
CPC ......... *G06Q 20/203* (2013.01); *G06Q 10/087* (2013.01); *G06Q 20/322* (2013.01)

(58) Field of Classification Search
CPC combination set(s) only.
See application file for complete search history.

(56) References Cited

U.S. PATENT DOCUMENTS 7,111,317 B1 * 9/2006 McIntyre ................. G06F 8/60
                                                        348/207.1
8,024,237 B1    9/2011 Davidson
                (Continued)

FOREIGN PATENT DOCUMENTS

WO    2014186123 A2    11/2014

OTHER PUBLICATIONS

Moussaid, "International Preliminary Report on Patentability issued in International Application No. PCT/US2014/035982", mailed Feb. 18, 2016, 8 pages.
(Continued)

*Primary Examiner* — Luna Champagne
(74) *Attorney, Agent, or Firm* — Johnson, Marcou & Isaacs, LLC

(57) ABSTRACT

One disclosed method includes recording a sale to a customer of a configurable mobile device at a retail point-of-sale system and providing the customer with a virtual stock-keeping-unit at the point-of-sale system. The virtual stock-keeping-unit represents a customized mobile device that has not yet been assembled. The method further includes granting the customer access to a mobile device configurator based on a configurator access code associated with the virtual stock-keeping-unit and generating, by the mobile device configurator, a bill of material in response to configuration input received by the mobile device configurator. The configurator then sends the bill of material to a manufacturing system for assembly of the customized mobile device and the customized mobile device is assembled in accordance with the bill of material and information associated with the virtual stock-keeping-unit. The customized mobile device is shipped from the place of assembly to the customer.

13 Claims, 8 Drawing Sheets

(51) Int. Cl.
*G06Q 10/08* (2012.01)
*G06Q 20/32* (2012.01)

(56) References Cited

U.S. PATENT DOCUMENTS

| | | | |
|---|---|---|---|
| 2006/0217996 A1* | 9/2006 | Graves | G06Q 20/105 705/41 |
| 2007/0063021 A1 | 3/2007 | Chakiris | |
| 2009/0055266 A1 | 2/2009 | Brody | |
| 2011/0265078 A1 | 10/2011 | Beatty | |
| 2012/0226620 A1 | 9/2012 | Junger | |
| 2012/0289216 A1 | 11/2012 | Urbanek | |
| 2013/0024364 A1 | 1/2013 | Shrivastava | |
| 2013/0173469 A1* | 7/2013 | Goebel | G06Q 30/0621 705/44 |
| 2014/0279073 A1* | 9/2014 | Tangen et al. | 705/14.73 |

OTHER PUBLICATIONS

Young, "International Search Report and Written Opinion issued in International Application No. PCT/US2014/035982", mailed Jan. 22, 2016, 9 pages.

\* cited by examiner

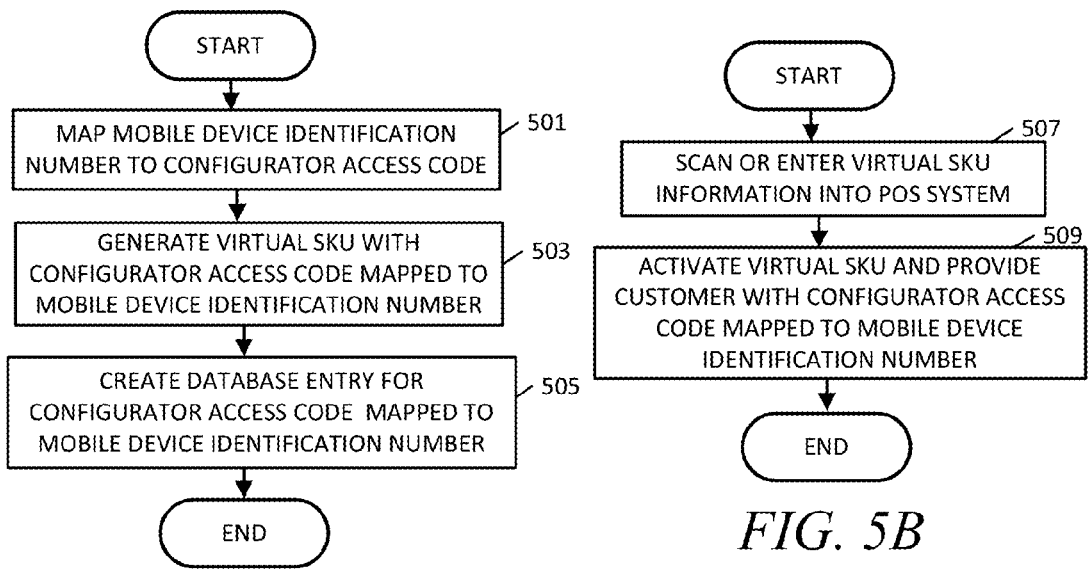
FIG. 5A
FIG. 5B
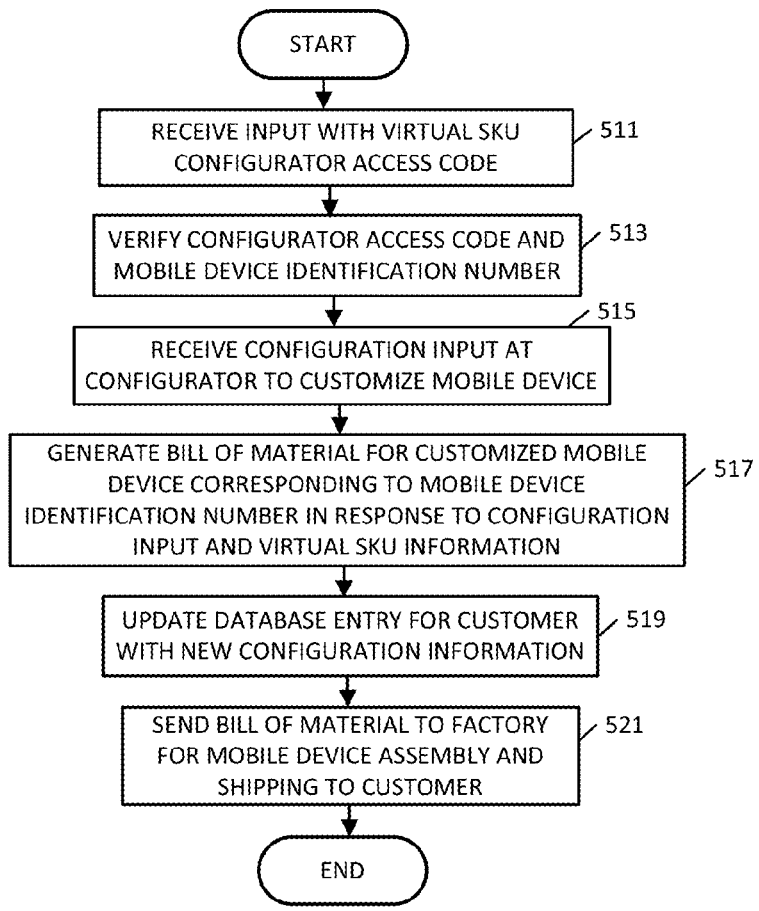
FIG. 5C

METHOD AND SYSTEM HAVING A VIRTUAL STOCK KEEPING UNIT FOR CONFIGURABLE MOBILE PHONE PURCHASES

FIELD OF THE DISCLOSURE

The present disclosure is related to systems and methods of operations for ecommerce systems, point-of-sale systems and product configuration systems.

BACKGROUND

Retail businesses that sell products usually maintain inventory of those products and employ methods for keeping track of such inventory. One approach to tracking inventory employs a stock keeping unit ("SKU") which may include a coded number that is assigned to an inventory item. The SKU may be unique to a specific inventory item, such as a part number, and may be a machine readable code such as a bar code. However the SKU is not necessarily a part number and may refer to a "lot" of stocked inventory items or to an assembly item which consists of various parts where each part has a unique part number. That is, a SKU may be used in various ways in the field of inventory management.

Retailers also often employ gift cards which serve as a cash substitute and provide a monetary equivalent that is paid for in advance by the gift giver. The gift card normally may be used to purchase products up to the monetary value, or used as a portion of a purchase along with additional tendered monetary value. In operation, gift cards must be activated and verified, and in some cases, checked for remaining monetary values.

BRIEF DESCRIPTION OF THE DRAWINGS

FIG. 5A is a flowchart showing a method of creating a virtual SKU card in accordance with an embodiment.

FIG. 5B is a flowchart showing a method of using a virtual SKU card at a point-of-sale system in accordance with an embodiment.

FIG. 5C is a flowchart showing a method of using the virtual SKU card to access a configurator system to customize a mobile device in accordance with an embodiment.

DETAILED DESCRIPTION

Figure 1:
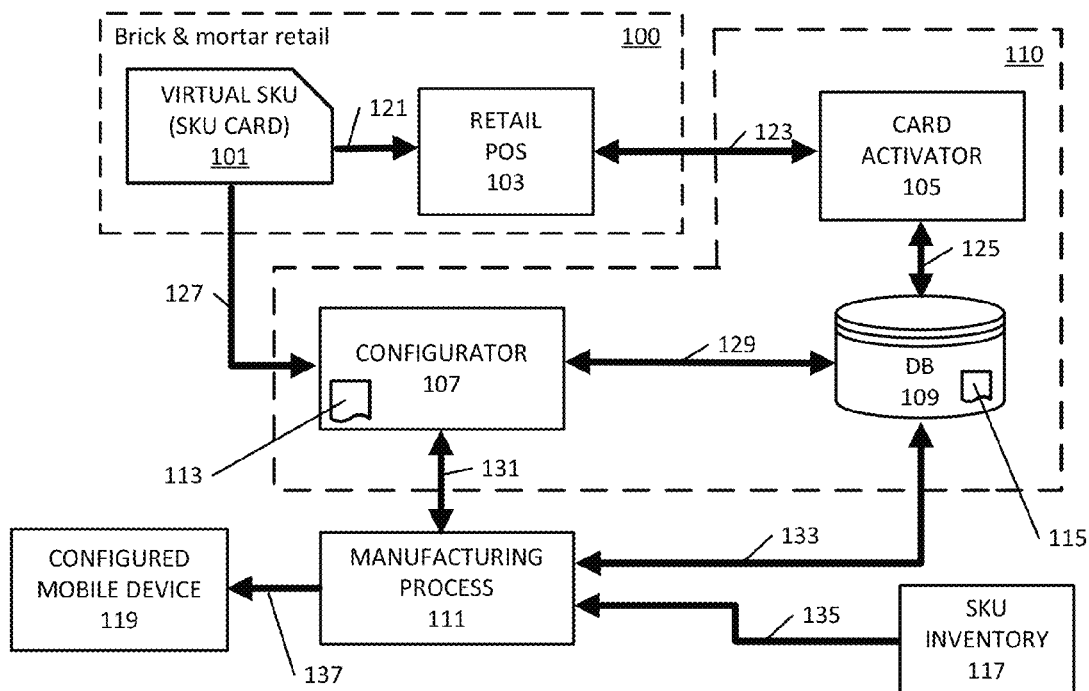
FIG. 1 is a block diagram of a brick-and-mortar store in conjunction with an ecommerce system in accordance with the embodiments.

The present disclosure provides a system and method related to a virtual stock-keeping-unit (SKU) for a configurable mobile device. The virtual SKU is used to manage various transactions involving the configurable mobile device. Because the "configurable mobile device" does not actually exist until configured and built, the virtual SKU serves as a place-holder and maintains certain product information until the actual mobile device is assembled. Among other advantages, the disclosed embodiments relieve a retailer or a network service provider of the need to maintain physical inventory of mobile devices for consumer sales. Instead, retailers or network service providers maintain virtual SKUs in accordance with the embodiments, which may be virtual SKU cards, or may be electronically stored virtual SKUs that may be provided to customers by, for example, print outs. Actual inventory is maintained at, or by, the manufacturer in conjunction with the virtual SKUs, which are processed during assembly of the actual configurable mobile devices. The configurable mobile devices are configured by a customer subsequent to making an in-store or online purchase and receiving a virtual SKU which may be a virtual SKU card or virtual SKU print out as mentioned above. The configurable mobile device is then subsequently assembled and shipped to the purchaser by the manufacturer. Information mapped to the virtual SKU is included in the software of the configured and shipped mobile device.

One disclosed method includes recording a sale to a customer of a configurable mobile device at a retail point-of-sale system and providing the customer with a virtual stock-keeping-unit at the point-of-sale system. The virtual stock-keeping-unit represents a customized mobile device that has not yet been assembled. The method further includes granting the customer access to a mobile device configurator based on a configurator access code associated with the virtual stock-keeping-unit and generating, by the mobile device configurator, a bill of material in response to configuration input received by the mobile device configurator. The configurator then sends the bill of material to a manufacturing system for assembly of the customized mobile device and the customized mobile device is assembled in accordance with the bill of material and information associated with the virtual stock-keeping-unit. The customized mobile device is shipped from the place of assembly to the customer.

In accordance with the embodiments, the virtual stock-keeping-unit is associated with a mobile device identification number such that assembling the customized mobile device includes programming the customized mobile device with the mobile device identification number.

Another disclosed method includes mapping a mobile device identification number to a configurator system access code, generating a SKU identifier in an inventory system, and printing a virtual SKU card having the mobile device identification number and a scratch off area concealing the configurator access code. The SKU identifier is related to the mobile device identification number and the configurator access code. The mobile device identification number may pertain to a particular mobile communication technology of a network in which the mobile device will be used. For example, the mobile device identification number may be an international mobile station equipment identity (IMEI) number, etc.

The method may further include entering information from the SKU card into a point-of-sale system, creating a database entry associating a customer with the SKU card and provisioning the SKU card to a customer to provide the customer access to the configurator system. The method may further include receiving the configurator system access code at a configurator system, granting access to the configurator system based on the configurator system access code and receiving configuration input to customize a mobile device related to the SKU identifier. The mobile device software is configured to include for example, an IMEI number, or some other suitable mobile device identification number that is provided on the SKU card. The method further includes generating a bill of material for the customized mobile device having the IMEI number, or other suitable mobile device identification number, provided on the SKU card and sending the bill of material to a manufacturing system for assembly of the customized mobile device.

In some embodiments, the method may include receiving a pre-activation request from a point-of-sale system for a configurable mobile device SKU identifier, providing, in response to the pre-activation request, a mobile device identification number such as, but not limited to, an IMEI number for the configurable mobile device. The IMEI or other mobile device identification number is mapped to a configurator system access code, and the SKU identifier is related to the mobile device identification number and the configurator access code. The method further includes receiving a request to activate the SKU identifier from the point-of-sale system and updating the configurator access code status to "activated" to grant access to a configurator system using the configurator access code.

In some embodiments, the method may include sending an email to a customer confirming activation of the SKU identifier. Additionally, the method may include providing information to the point-of-sale system for printing a SKU card having the mobile device identification number and the configurator system access code.

The disclosed methods may also accommodate customer refunds where, in one example, the SKU card may be returned. Such methods include receiving a refund request from the point-of-sale system, verifying that the configurator system access code had been activated and generating a new configurator system access code. In some embodiments, the method may also include resetting the configurator system access code status and making the mobile device identification number available.

In another embodiment, the method may include receiving a refund request from the point-of-sale system, verifying that the configurator system access code had been expired, generating a new configurator system access code, resetting the configurator system access code status. Some embodiments may also include making the mobile device identification number available for use by another customer.

In another embodiment, the method may include receiving a refund request from the point-of-sale system, verifying that the configurator system access code had not been activated and had not been expired, determining that the configurator system access code had been cancelled and deactivating the configurator system access code and the mobile device identification number.

Turning now to the drawings, FIG. 1 provides a block diagram of an ecommerce system in accordance with the embodiments. The various embodiments provide methods of operation for performing transactions between, for example, a retailer, a manufacturer and a consumer. The terms "consumer" and "customer" are used interchangeably herein to refer to an end user, that is, one who purchases a configurable mobile device in accordance with the systems and methods of operation disclosed herein. The example e-commerce system illustrated in FIG. 1 consists of a brick-and-mortar retail store 100 and an e-commerce network 110. The brick-and-mortar retail store 100 includes a retail point-of-sale (POS) system 103. The retail POS system 103 communicates with a card activator 105, in an e-commerce network 110, which performs authentication and verification procedures to authenticate and activate virtual SKUs prior to provisioning of the virtual SKUs to customers.

In accordance with the embodiments, a customer may enter the brick-and-mortar retail store 100 in order to purchase a configurable mobile device, and will receive a virtual SKU in lieu of the actual mobile device. In one example, the brick-and-mortar retail store 100 may include a display that shows various models of mobile devices having various colors or other features that the customer can physically observe while in the brick-and-mortar retail store 100. Located somewhere near the mobile device display is a set of associated "virtual SKU cards" that the customer can relate to a specific model of mobile device via product and model identifications at the product display or by proximity of the SKU cards to the relevant mobile device model. Once a customer has decided on a given color or model of interest, the customer may select an associated SKU card from the display and bring the SKU card to the retail POS system 103.

Figure 2:
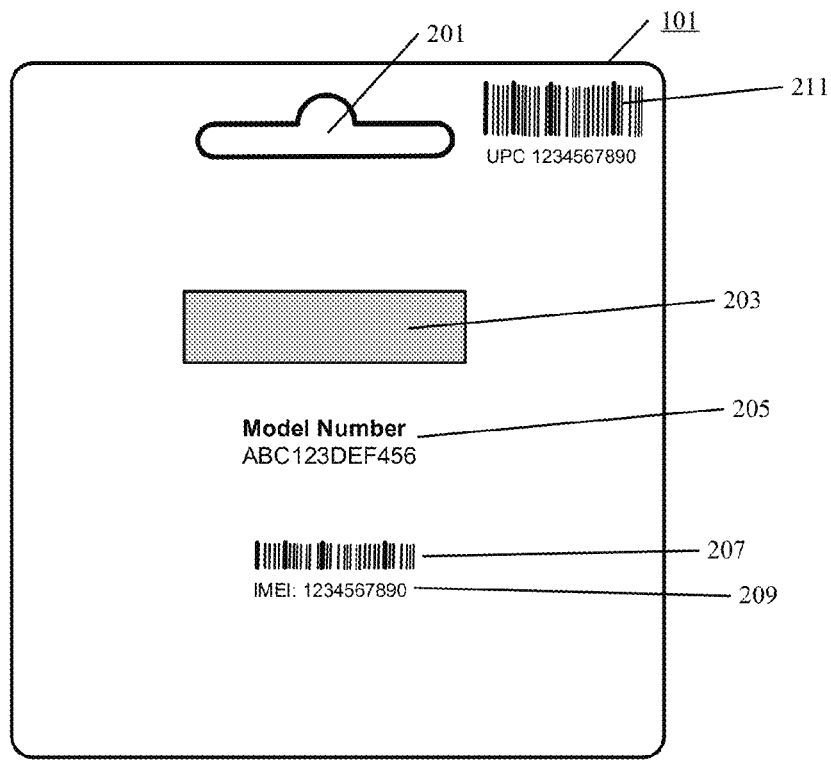
FIG. 2 is diagram of an example virtual stock-keeping-unit (SKU) card in accordance with an embodiment.

One example of a virtual SKU card 101 is illustrated in FIG. 2. The example virtual SKU card 101 may be made of cardboard or plastic and may have a punch out 201 to enable the virtual SKU card 101 to be hung on a display hook. The virtual SKU card 101 will have at least a mobile device identification number that will be tied to the mobile device hardware at the time of assembly. That is, the mobile device identification number may be any suitable type of mobile device identification number and may be specified according to any of various telecommunication standards and formats such as, but not limited to, an FCC electronic serial number (ESN), a GSM International Mobile Equipment Identity (IMEI), 3GPP2 Mobile Equipment Identifier (MEID), or any other suitable mobile device identification number, etc. In other words, the mobile device identification number is some unique number that identifies mobile device hardware in a corresponding mobile device network. Such numbers specified by standards may therefore require that the format or telecommunication standard requirements applicable to the specific mobile device identification number conform to one or more network technology standards for networks in which the mobile device is to be used, such as, but not limited to, 3GPP, 3GPP2, GSM, UMTS, LTE, iDEN, etc. During assembly of a mobile device, the mobile device identification number is programmed into a mobile device memory in a secure manner, such that it cannot be erased by customer. The process of programming the mobile device is sometimes referred to as "burning in" the mobile device identification number to mobile device memory such that it cannot be erased or modified by tampering. A network service provider may use the mobile device identification number to grant or deny access to specific mobile devices on the network service provider's network or networks. For example, some mobile devices may be blacklisted, based on their respective mobile device identification numbers, such that they may not be given access to certain networks.

Mobile devices for customers in good standing will be on a white list, based on their respective mobile device identification numbers, so that they are properly granted access to networks and services for which the respective customers are valid subscribers.

The virtual SKU card 101 may also have a mobile device identification number barcode field 207 that enables the mobile device hardware identification number to be scanned by a sales agent into the retail POS system 103. In the example virtual SKU card 101 shown in FIG. 2, the mobile device hardware identification number is an IMEI and is also printed on the virtual SKU card 101 in a mobile device identification number field 209.

The example virtual SKU card 101 may also provide other printed information such as printed model number 205 and Universal Product Code (UPC) barcode field 211, which may also be scanned into the retail POS system 103. A scratch off field 203 conceals a configurator access code that the customer may use subsequently to access the configurator 107 of the e-commerce network 110.

Thus, when a customer brings a virtual SKU card 101 to the retail POS system 103, a customer service agent may enter information from the virtual SKU card 101 into the retail POS system 103. This may be accomplished by either manual data entry by the customer service agent, or by using a barcode scanner to scan various bar code fields. For example, the customer service agent may scan the mobile device identification number barcode field 207 and the UPC barcode field 211 rather than performing any manual data entry. The customer service agent will also obtain customer information and enter the customer information into the retail POS system 103. The customer information may be any suitable information useful for identifying the customer such as, but not limited to, the customer's name, address, driver license number, Social Security number, or any other useful information, etc. The data entry made by the customer service agent, including scanning of information from the virtual SKU card 101, is represented in FIG. 1 as data entry point 121. Further details regarding FIG. 1 and methods of operation are described below with respect to FIG. 6, FIG. 7 and FIG. 8. However, before describing further details of FIG. 1, methods of operation for transactions between a network service provider, mobile device manufacture and consumer (i.e. customer) will now be discussed, since these transactions provide a setting in which to better understand the methods of operation exemplified by FIG. 1.

Figure 3:
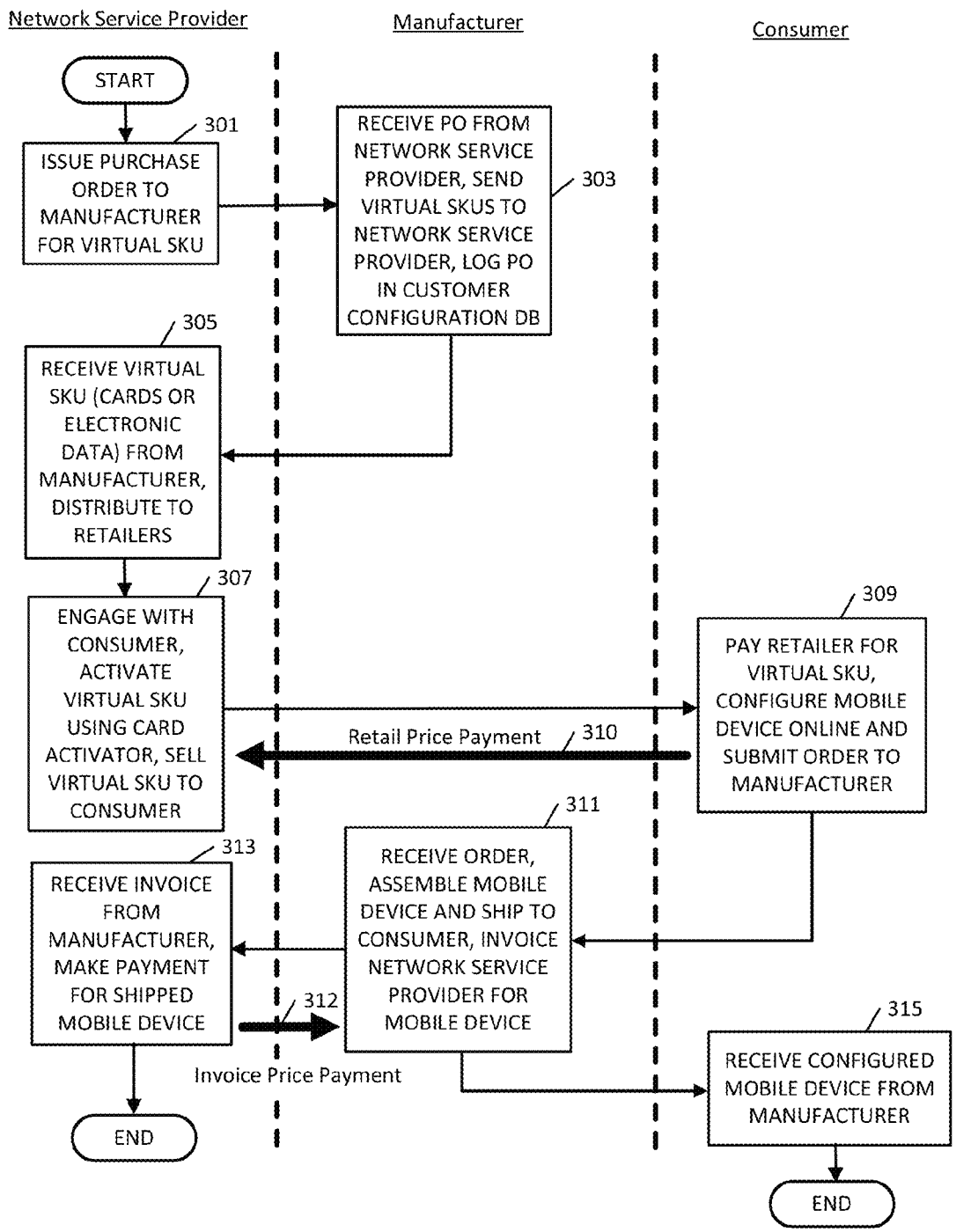
FIG. 3 is a flowchart illustrating sales transaction flow between a network service provider, a manufacturer and a consumer in accordance with the embodiments.

In the various embodiments, mobile devices may be purchased and sold by various network service providers (also referred to as "network operators" or "carriers") for the purpose of selling to consumers. The flowchart of FIG. 3 illustrates a related sales transaction flow between a network service provider, a manufacturer and a consumer in accordance with the embodiments. Each of the various operation blocks of the flowchart shown in FIG. 3 are positioned within one of three partitioned sections corresponding to a network service provider, manufacturer, and consumer. That is, the sales transaction involves actions taken by each of the three entities (network service provider, manufacture and consumer) corresponding to the FIG. 3 partitions. Additionally, each one of the operation blocks of the flowchart may represent one or more steps taken by the entity related to the specific operation block and based on the block's position within the partitions.

Therefore a method of operation begins with a network service provider and in operation block 301 the network service provider may issue a purchase order to the manufacturer for a number of virtual SKUs. In prior methods of operation, the network service provider would purchase actual mobile devices that would be shipped from the manufacturer to the network service provider and invoiced. Accordingly, the network service provider would be required to stock the inventory of mobile devices including receiving the shipment, processing the shipment, providing the required storage space, etc. In accordance with the embodiments, the network service provider has an advantage in that it no longer needs to store inventory of actual mobile devices. Instead, the network service provider only needs to receive, and possibly store, virtual SKUs which may be embodied as electronic information or may be embodied as virtual SKU cards such as example virtual SKU card 101 shown in FIG. 2.

Thus, in operation block 303, the manufacturer receives the purchase order from the network service provider and, in response, sends the appropriate number of virtual SKUs to the network service provider and logs the purchase order in a customer configuration database. An example of the customer configuration database is shown in FIG. 1 as customer configuration database 109. In operation block 305, the network service provider receives the virtual SKUs, which may be virtual SKU cards or virtual SKU electronic data, or combinations of both, as was mentioned above, and may then proceed to distribute the virtual SKUs to retailers. In operation block 307, the network service provider may engage with consumers and correspondingly activate virtual SKUs using a card activator entity such as card activator 105 shown in the example of FIG. 1. The network service provider therefore may sell the virtual SKUs to consumers. It is to be understood that the network service provider may either engage in consumer sales activity directly, or may engage third-party retailers to perform the consumer sales. That is, in some embodiments, the activities of operation block 307 may include a mobile device retailer or may be done by a retail sales operation of the network service provider. In any event, the method of operation proceeds to operation block 309 in which the consumer pays the retailer for the virtual SKU. That is, a retail price payment 310 is made by the consumer to the network service provider. In one example, the network service provider may operate a brick-and-mortar retail store such as the brick-and-mortar retail store 100 illustrated in FIG. 1.

The consumer may obtain a virtual SKU card 101 at the brick and mortar retail store 100 as was discussed above previously with respect to FIG. 1. Information from the virtual SKU card 101 may then be entered into the retail POS system 103 as represented by data entry point 121. In operation block 309, the consumer may configure the mobile device online, subsequent to the sale, and submit an order to the manufacturer. The consumer makes retail price payment 310 which is represented by an arrow that flows from the consumer to the network service provider. This payment may be made at the retail POS system 103, which may be owned and operated by the network service provider.

The method of operation then proceeds to operation block 311, where the manufacturer receives the order for the configurable mobile device, assembles the mobile device and ships it to the consumer. The network service provider is then invoiced by the manufacturer for the mobile device. The method of operation then proceeds to operation block 313, in which the network service provider receives the invoice from the manufacturer, and makes a payment for the shipped configured mobile device. The invoice price payment 312 is made by the network service provider to the manufacturer which is represented in FIG. 3 by an arrow that flows from the network service provider to the consumer.

From the standpoint of the network service provider, the method of operation is completed and ends as shown. Returning briefly to operation block 311, the manufacturer ships the product to the consumer as shown in operation block 315. That is, in operation block 315, the consumer receives the configured mobile device from the manufacturer, and the method of operation ends with respect to the consumer and the manufacturer as shown.

Therefore among other advantages provided by the various disclosed embodiments, the shipment of the actual mobile device, that is, the configured and assembled mobile device that was configured by the consumer, is assembled by the manufacturer and shipped to the consumer directly rather than from the network service provider or from a third-party retailer. As would be understood, the manufacturer must maintain inventory of mobile device hardware and related components related to the configurability, which relieves the network service provider or any retail store entity from the requirement of having to store inventory.

Figure 4:
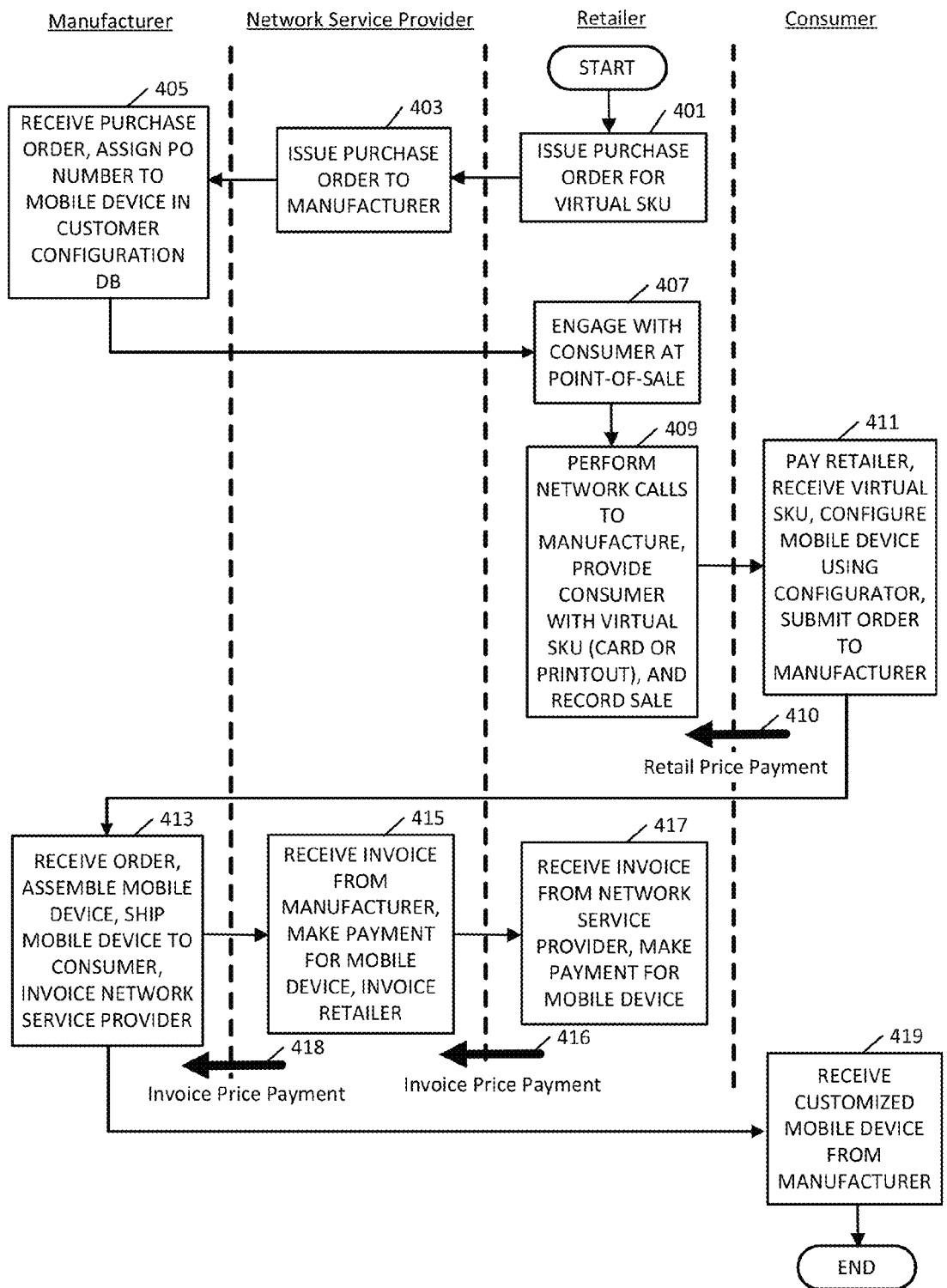
FIG. 4 is a flowchart illustrating sales transaction flow between a network service provider, a manufacturer, a retailer and a consumer in accordance with the embodiments.

FIG. 4 is a flowchart illustrating sales transaction flow between a network service provider, a manufacturer, a retailer and a consumer in accordance with the embodiments. FIG. 4 is therefore partitioned into four sections, with each section corresponding to actions taken by one of the four aforementioned entities; the network service provider, the manufacturer, the retailer or the consumer.

The flowchart of FIG. 4 is applicable to a scenario in which the network service provider contracts with the third-party retailer for the purpose of providing mobile devices to the consumer. In other words, a third-party retailer other than the network service provider operates a brick-and-mortar retail store such as the brick-and-mortar retail store 100 illustrated in FIG. 1. In the example scenario of FIG. 4, the method of operation begins with the retailer in operation block 401, where the retailer issues a purchase order for virtual SKUs to the network service provider. In operation block 403, the network service provider issues a purchase order to the manufacturer, which is received by the manufacturer in operation block 405. It is to be understood that the term "manufacturer" as used in the present disclosure may refer to an original equipment manufacturer (OEM) or to "value-added resellers" who assemble mobile devices under authorization by an OEM, or any other suitable business arrangement, etc. That is, the term "manufacturer" is not to be construed as a limiting term as used herein, but rather is used herein to refer to an entity that assembles and ships mobile devices where the assembly is governed by configuration customization provided by a consumer.

In operation block 405, the manufacturer receives the purchase order and assigns the purchase order number to a required quantity of mobile devices in the customer configuration database. The method of operation then proceeds to operation block 407 which is again under the control of the retailer. That is, the retailer engages with the consumer at a point-of-sale system, such as the retail POS system 103. In operation block 409, the retailer's POS system, such as retail POS system 103, communicates with the manufacturer's system by, for example, performing network communication or web service calls to the manufacturer to authenticate, verify and activate the virtual SKU for a particular consumer. The retail POS system 103 may receive an authentication confirmation from the card activator 105 over the interface 123. The consumer is then provided with the virtual SKU, which may be a plastic card or a printout at the brick-and-mortar retail location, and the sale is recorded.

In operation block 411, the consumer pays the retailer for the configurable mobile device and in return receives the virtual SKU. The consumer makes retail price payment 410 which is represented by an arrow that flows from the consumer to the retailer. This payment may be made at the retail POS system 103, which may be owned and operated by the network service provider or which may be owned and operated by a third-party retailer authorized to sell mobile devices under contract with the network service provider or under some other suitable business arrangement.

The consumer subsequently configures the mobile device using a configurator, such as example configurator 107 shown in FIG. 1, and submits an order to the manufacturer. The method of operation then proceeds to operation block 413 which is handled by the manufacturer.

In operation block 413, the manufacturer receives the order and assembles the mobile device according to the configuration information provided by the consumer in operation block 411. Also in operation block 413, the manufacturer ships the mobile device to the consumer and invoices the network service provider. Proceeding to operation block 415, the network service provider receives the invoice from the manufacturer, and subsequently makes payment for the configured mobile device. This is illustrated as invoice price payment 418 which flows from the network service provider to the manufacturer.

Further in operation block 415, the network service provider invoices the retailer for the configured mobile device. Therefore, in operation block 417, the retailer receives the invoice from the network service provider and makes a payment to the network service provider for the configured mobile device. This is exemplified by invoice price payment 416 which flows from the retailer to the network service provider. Returning briefly to operation block 413, the manufacturer ships the mobile device to the consumer and thus, in operation block 419, the consumer receives the customized mobile device from the manufacture and the method of operation ends as shown. The above discussion of the flowcharts and methods of operation related to FIG. 3 and FIG. 4 have set the groundwork for further discussion of the details and methods of operation related to FIG. 1.

FIGS. 5A, 5B, 5C and 5D provide further details of operations related to the flowcharts of FIG. 3 and FIG. 4, and the diagram of FIG. 1. FIG. 3A is a flowchart showing a method of creating a virtual SKU card in accordance with an embodiment. As discussed above, one advantage of the virtual SKU card 101 is that a network service provider or retailer does not need to physically stock mobile devices or components. Instead, the network service provider or retailer may issue a purchase order to the mobile device manufacturer and, instead of receiving a bulk of mobile devices, receive a bulk of virtual SKU cards that may be used at retail store locations for sales to product consumers. The mobile device manufacturer will receive purchase orders, and corresponding bills of material, based on sales of the virtual SKU cards (where a virtual SKU card represents a configurable mobile device) and consumer configuration information and will ship the configured mobile device products directly to the consumer. That is, the network service provider or retailer are saved from the burden of maintaining and storing mobile device inventory which, among other advantages, saves storage space at the brick-and-mortar retail store 100 location or some other inventory storage location.

The virtual SKUs may be generated by the mobile device manufacturer as shown by one example method of operation provided in FIG. 5A. In operation block 501, a mobile device identification number such as, but not limited to, an IMEI, MEID, etc., is mapped to a configurator access code.

In operation block 503, a virtual SKU may then be generated having the configurator access code and the mapped mobile device identification number. In operation block 505, the mapping is recorded in a customer configuration database 109 where it may be accessed for subsequent transactions. The process then ends, however; this process is repeated for each virtual SKU to be generated. In some embodiments, the virtual SKU information may be printed onto a virtual SKU card such as example virtual SKU card 101. FIG. 5B is a flowchart showing an example method of using a virtual SKU card at a POS system in accordance with an embodiment.

As was described above with respect to FIG. 1 and FIG. 2, a customer service agent at the retail POS system 103 may scan or enter the virtual SKU card 101 information into the retail POS system 103 as illustrated by data entry point 121. This operation is shown in operation block 507. In operation block 509, the virtual SKU card 101 information is then sent from the retail POS 103 system to the card activator 105 entity, over an interface 123, and the virtual SKU card 101 is activated. Activation enables the configurator access code associated with the virtual SKU card 101 so that the consumer can use the configurator access code to access the configurator 107 and customize his or her configurable mobile device. The virtual SKU card 101 information is then mapped to, and associated with, the customer information and a record 115 is created in the customer configuration database 109 over interface 125. The method of operation then ends.

FIG. 5C is a flowchart showing a method of operation for using a virtual SKU card to access the configurator 107 to customize a mobile device in accordance with an embodiment. In operation block 511, the configurator 107 may initially receive login input which includes the virtual SKU card configurator access code. For example, the customer may scratch off the scratch off field 203 on virtual SKU card 101 to reveal the configurator access code which must be entered into an interface, such as a web-based interface, of the configurator 107. In operation block 513, the configurator 107 will communicate with the customer configuration database 109 over interface 129 to verify the configurator access code and the mobile device identification number by, for example, checking record 115. In operation block 515, the configuration 107 may receive configuration input 127 from the user to customize the mobile device. At this point, the customer may use the configurator 107 to configure and customize the mobile device in various ways. For example, the customer may select various design features such as enclosure types, software installations, memory configuration, processing configurations, etc. In operation block 517, after the customer has completed entering all configuration input 127 into the configurator 107, the configurator 107 will generate a bill of material 113 for the customized mobile device in response to the configuration input 127. In operation block 519, the configurator 107 will communicate with the customer configuration database 109 over interface 133 and will accordingly update record 115 to include the new configuration information. In operation block 521, the configurator 107 will send the bill of material 113 to the manufacturing processing system 111, over interface 131, for mobile device assembly and shipping to the customer. The configured mobile device 119 will then be shipped to the customer by shipping process 137 and the method of operation then ends as shown. The manufacturing process 111 will obtain the needed mobile device components from the actual SKU inventory 117 as shown by supply line 135.

In some embodiments, the configurator 107 may allow adding features that increase the price of the configured mobile device above the retail price paid by the customer as described with respect to FIG. 4 and FIG. 5. In such embodiments, the configuration 107 may apply additional charges and accept payments as required for such features or upgrades that the customer selected during the configuration process. Also in such embodiments, the retail price payments may flow from the consumer direct to the manufacturer, without the need for further involvement by the network service provider or the retailer. However, any suitable payment model may be used with any suitable flow of payments from the consumer.

Figure 5D:
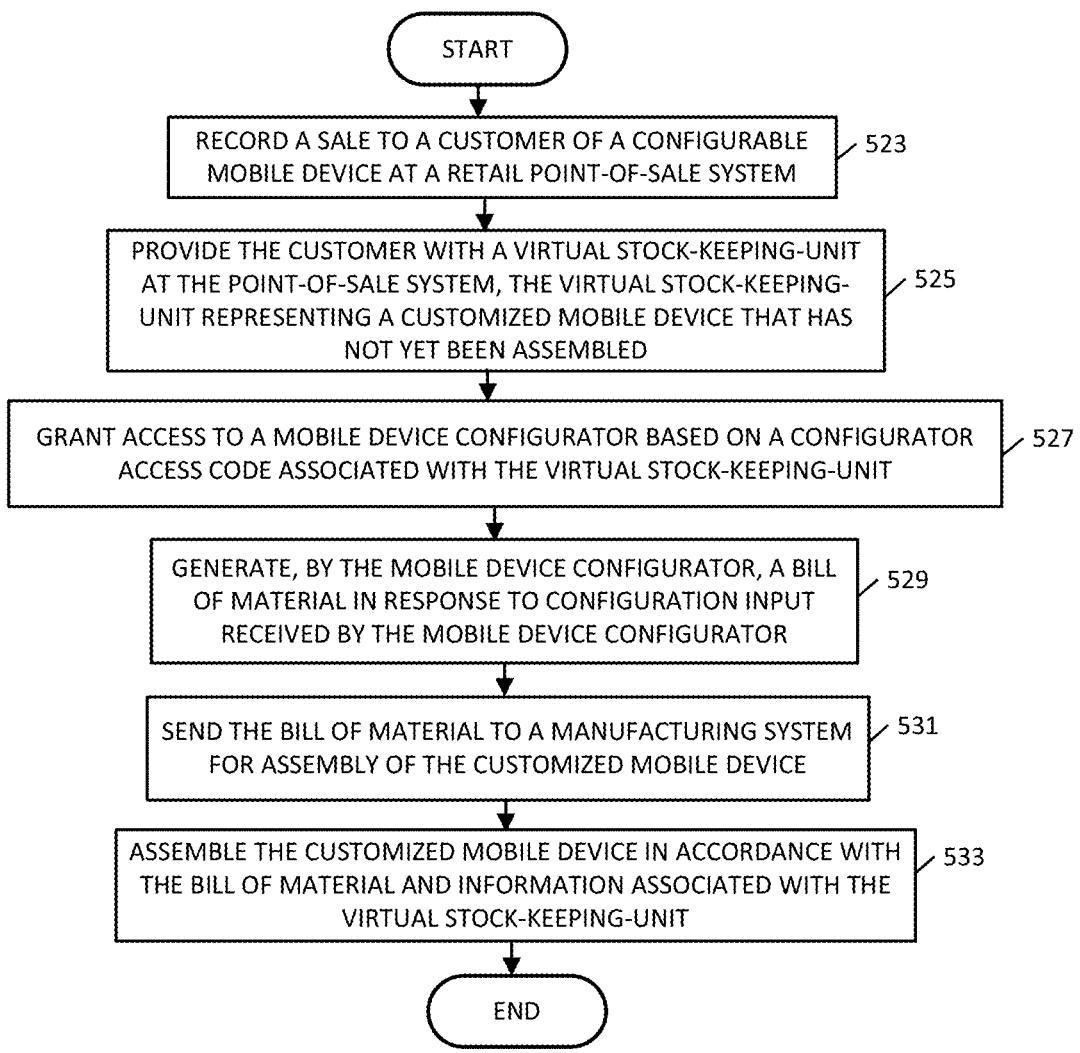
FIG. 5D is a flowchart showing a method of using a virtual SKU from an initial point-of-sale through to assembly and shipping of a configured mobile device in accordance with an embodiment.

FIG. 5D is a flowchart showing a method of using a virtual SKU from an initial point-of-sale through to assembly and shipping of a configured mobile device in accordance with an embodiment. The method of operation shown in FIG. 5D may begin at the brick and mortar retail store 100, when a customer service agent, as shown in operation block 523, records a sale to a customer of a configurable mobile device at the retail point-of-sale system 103. In operation block 525, the customer service agent provides the customer with a virtual stock-keeping-unit at the retail POS system 103, where the virtual stock-keeping-unit represents a customized mobile device that has not yet been assembled. The virtual stock-keeping unit may be a virtual SKU card 101, or may be a printout, email, or text message having the virtual SKU information.

In operation block 527, the customer is granted access to a mobile device configurator, such as configurator 107, based on a configurator access code associated with the virtual stock-keeping-unit. In operation block 529, the configurator 107 generates a bill of material in response to configuration input received by the configurator 107. The configurator 107 will then send the bill of material to a manufacturing system for assembly of the customized mobile device as shown in operation block 531. In operation block 533, the manufacturing process 111 will assemble the customized mobile device in accordance with the bill of material and information associated with the virtual stock-keeping-unit. The method of operation ends and the customized mobile device is shipped to the customer.

In accordance with the embodiments, the virtual stock-keeping-unit is associated with a mobile device identification number and the customized mobile device is assembled which includes programming the mobile device with the mobile device identification number. As discussed above, the mobile device identification number may be any one of an electronic serial number (ESN), an International Mobile Equipment Identity (IMEI), a Mobile Equipment Identifier (MEID) or some other suitable standardized specified format, etc.

Among other advantages, the systems and methods described above employ a virtual SKU or virtual SKU card that serves as a "virtual" SKU in that the virtual SKU is a representation of a configurable mobile device that does not yet exist and is not complete until the user performs a configuration operation using the configurator 107 to generate a corresponding bill of material such that the actual mobile device can be assembled at the factory. Another advantage of the virtual SKU card 101, is that a customer may examine various models of mobile device at the brick-and-mortar retail store 100 location to assist the customer in making a decision regarding the type and model mobile device the customer wishes to purchase. The virtual SKU card 101 serves as a tangible item that the customer may take with them at the time of purchase and which grants the user access to the configurator 107 using a card activation operation similar to that used for gift cards.

Figure 6:
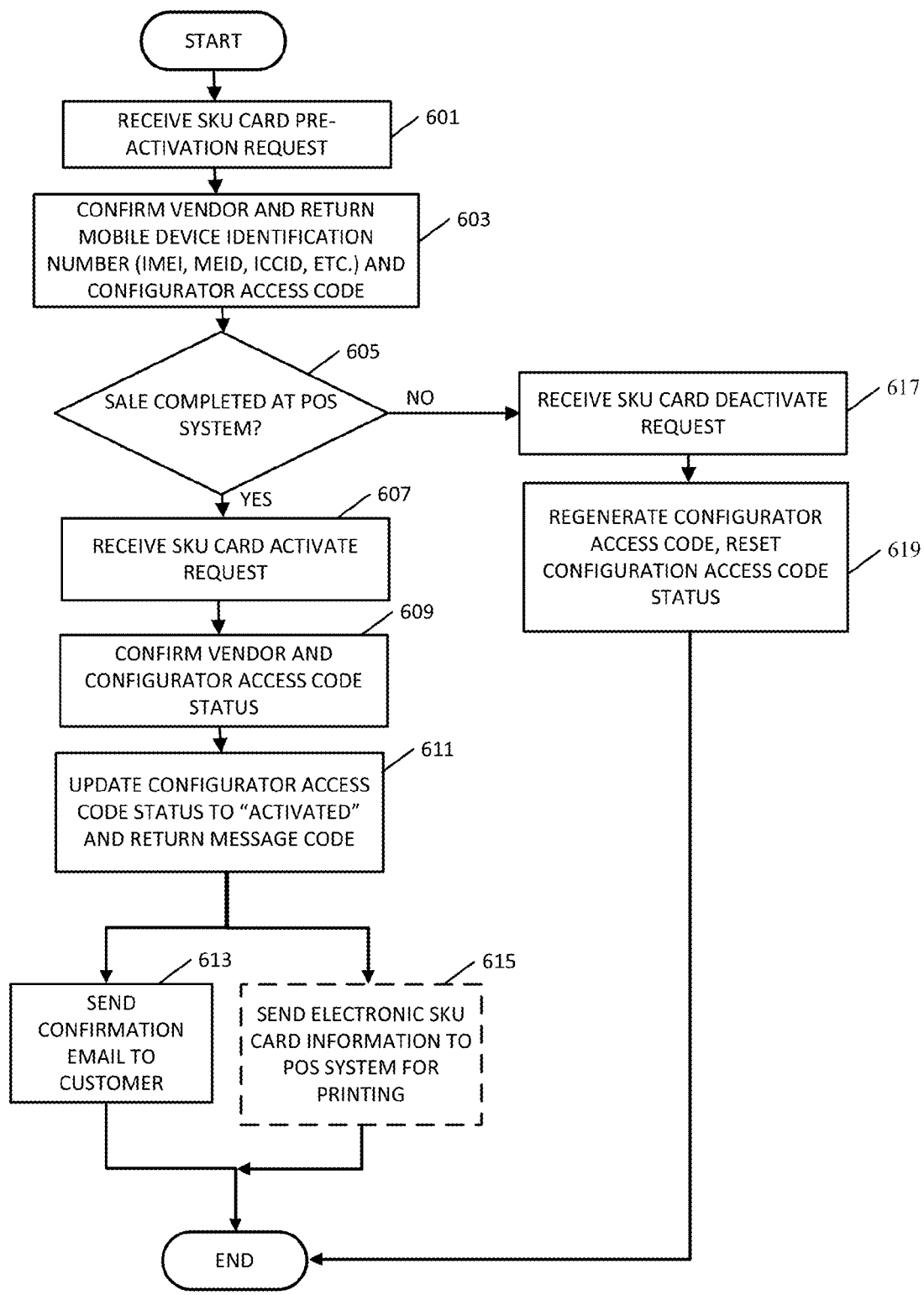
FIG. 6 is a flowchart showing a method of operation of a customer configuration database during a sale process in accordance with an embodiment.

FIG. 6 is a flowchart showing further details of operation of the customer configuration database 109 during a sale process in accordance with an embodiment. The method of operation begins at the retail POS system 103 when a customer begins the sale process. In operation block 601, the customer configuration database 109 receives a virtual SKU card pre-activation request from the card activator 105 over interface 125. In operation block 603, the customer configuration database 109 confirms the vendor and returns the mobile device identification number which may be, but not limited to an IMEI, MEID, or some other suitable mobile device identification number, etc., and also returns an associated configurator access code.

At decision block 605, the method of operation branches based on whether or not the sale is completed at the retail POS system 103. If the sale has been completed at decision block 605, then the customer configuration database will receive a virtual SKU card activate request as shown operation block 607 and will confirm the vendor and configurator access code status in operation block 609. In operation block 611, the customer configuration database 109 will then update a configurator access code status to "activated" and return the appropriate message code to the retail POS system 103. As shown in FIG. 1, communication between the retail POS system 103 and the customer configuration database 109 may be intermediated by the card activator 105. Therefore, communication from the customer configuration database 109 may flow over interface 125 to the card activator 105 and be passed on to the retail POS system 103 over interface 123.

The various "interfaces" discussed herein may include connectivity such as network connections over an intranet or the Internet or some other suitable network, and communication protocols for communicating in a secure manner between ecommerce network entities such as, but not limited to, the retail POS system 103, card activator 105, customer configuration database 109, configurator 107 and manufacturing process 111. Such communication protocols may include database communication protocols and various ecommerce communication protocols, web service calls, etc., that may be standardized. Such connectivity and communication protocols are understood by those of ordinary skill and therefore specific details are not provided herein as any suitable connectivity or communication protocols may be employed to implement the various embodiments in light of the detailed description and examples of systems and methods of operations in accordance with the embodiments herein disclosed.

In some embodiments the customer configuration database 109 may send a confirmation email to the customer, as shown in operation block 613, at which point the method of operation ends. Alternatively, in some embodiments, an electronic virtual SKU card may be used rather than a physical virtual SKU card, i.e. a print out or emailed virtual SKU may be provided in lieu of example virtual SKU card 101. In the case of an electronic virtual SKU, the customer configuration database 109 may send electronic virtual SKU information to the retail POS system 103 which may be printed and handed to the customer as shown in operation block 615. Operation block 615 is therefore shown with dotted lines because it is an alternative to a physical virtual SKU card. As discussed previously, physical virtual SKU cards may be provided at a product display.

Returning to decision block 605, if the sale is not completed at the retail POS system 103, the customer configuration database 109 may receive a virtual SKU card deactivate request as shown in operation block 617. In that case, the customer configuration database 109 will regenerate the configurator access code and will reset the configuration access code status as shown in operation block 619. In some embodiments, the customer configuration database 109 may also make the mobile device identification number available for use by the next customer. At that point, the method of operation ends.

Figure 7:
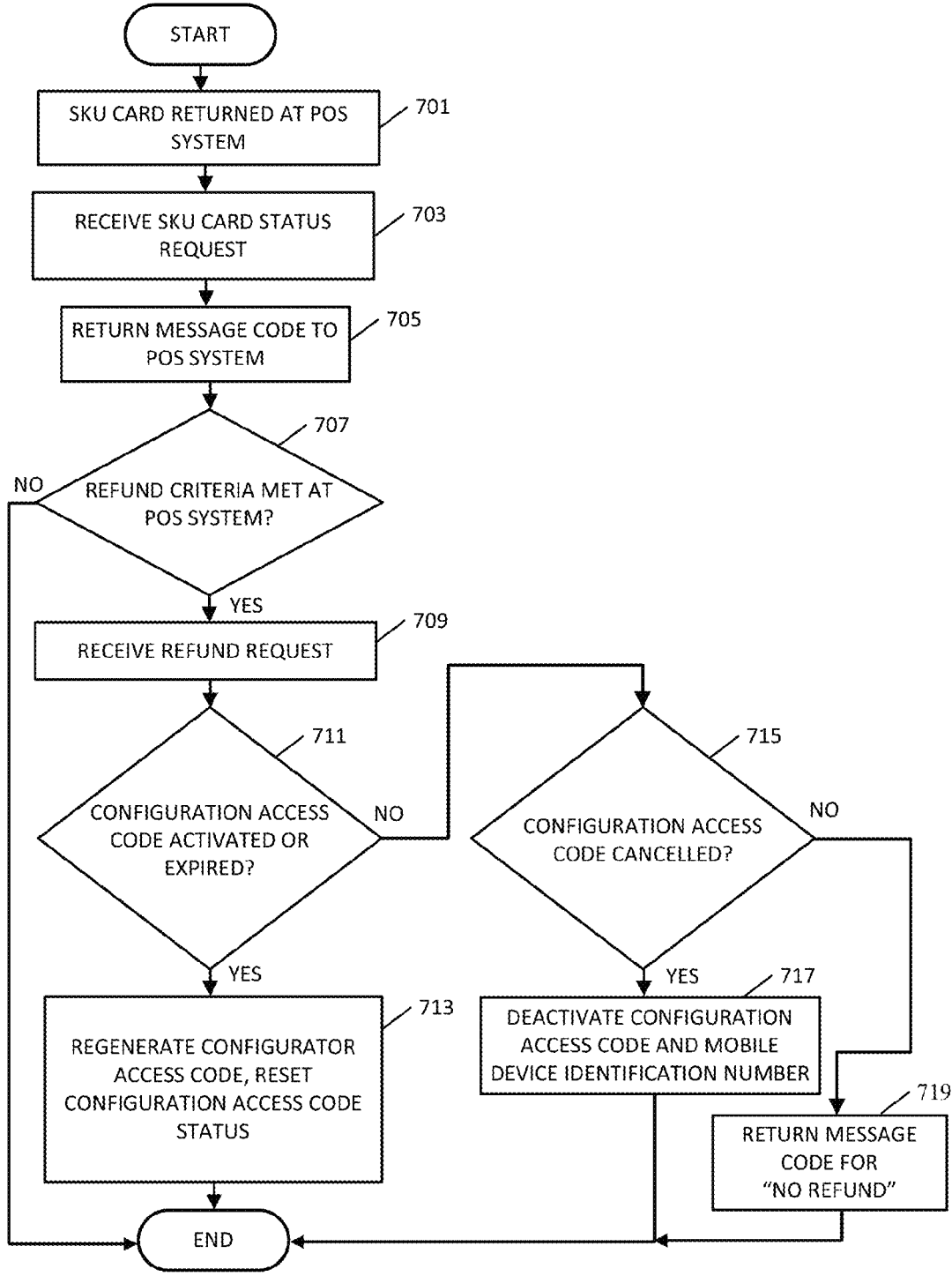
FIG. 7 is a flowchart showing a method of operation of the customer configuration database during a refund process in accordance with an embodiment.

FIG. 7 is a flowchart showing another example method of operation of customer configuration database 109 during a refund process in accordance with an embodiment. The method of operation may begin at the retail POS system 103 when a customer begins the refund process, but may also be initiated by the customer online in some embodiments. Therefore, in one example, a customer may return to the brick-and-mortar retail store 100 and return the virtual SKU card 101 to a customer service agent at the retail POS system 103. At operation block 701, the customer service agent may enter the virtual SKU card 101 information into the retail POS system 103 by manual data entry or by scanning the appropriate bar code fields. Subsequently, in operation block 703, the retail POS system 103 will send a virtual SKU card status request to the customer configuration database 109 and the customer configuration database 109 will return an appropriate message code to the retail POS system 103 in response as shown in operation block 705.

If appropriate refund criteria are met at the retail POS system 103, at decision block 707, then the customer configuration database 109 will receive the refund request in operation block 709. If the refund criteria is not met at the retail POS 103 system at decision block 707, then the method of operation ends as shown. The customer configuration database 109 will check if the configuration access code has been activated or whether it is expired as shown in decision block 711. If either of the two criteria is met at decision block 711, that is, if the access code has already been activated or is expired, then the customer configuration database 109 will regenerate the configurator access code, and reset the configuration access code status as shown in operation block 713. In some embodiments, the customer configuration database 109 may also make the mobile device identification number available for use by the next customer. The method of operation then ends. However, if the configuration access code has not been activated and has not expired in decision block 711, then the customer configuration database 109 will check whether the configuration access code is been canceled as shown in decision block 715. If the configurator access code has not been canceled at decision block 715, then the customer configuration database 109 will return the message code for no refund to the retail POS system 103 as shown in operation block 719 and the method of operation ends. Otherwise, if the configurator access code was canceled as at decision block 715, then the customer configuration database 109 will deactivate the configuration access code and the mobile device identification number as shown in operation block 717 and the method of operation ends as shown.

Figure 8:
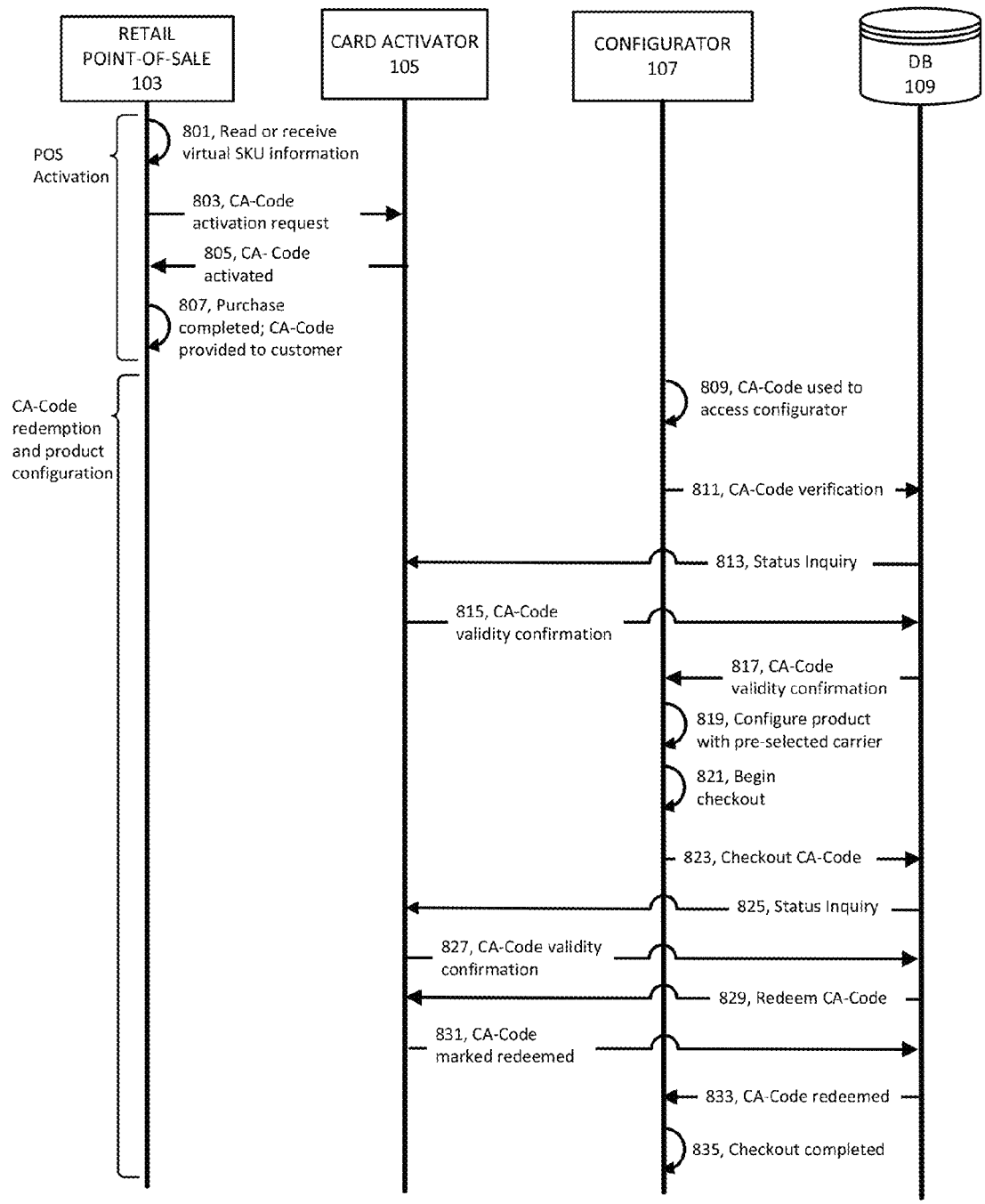
FIG. 8 is a message flow diagram showing interaction between a retail point-of-sale system, a card activator entity, a configurator system and a customer configuration database in accordance with an embodiment.

FIG. 8 is a message flow diagram showing details of interactions and communication between the retail POS system 103, the card activator 105, the configurator 107 and the customer configuration database 109 in accordance with an embodiment. Beginning with operation 801, the virtual SKU card information is read into the retail POS system 103 or, in some embodiments, the virtual SKU information is retrieved from memory storage. A configurator access code activation request 803 is sent to the card activator 105. The card activator 105 send a configurator access code "activated" confirmation 805 back to the retail POS system 103 which informs the retail POS system 103 that the virtual SKU card is indeed activated. Operation 807 shows that the purchase is completed at the retail POS system 103 and that the virtual SKU card having the configurator access code is provided to the customer. The bracketed portions of FIG. 8 illustrate the interactions and communications involved in the POS virtual SKU activation process. Once the POS virtual SKU activation process is completed, the customer then enters into the configurator access code redemption and product configuration process as shown by the subsequent bracketed portion of FIG. 8.

The first operation of the configurator access code redemption and product configuration process is operation 809 where the configurator access code is used by the customer to access the configurator 107. The configurator 107 will send the configurator access code verification message 811 to the customer configuration database 109. The customer configuration database 109 will send a status inquiry 813 to the card activator 105 which will provide, in return, the validity confirmation message 815. The validity confirmation will be forwarded from the customer configuration database 109 to the configurator 107 as shown by message 817. The user may then perform configuration operation 819 which involves configuring and customizing the mobile device product. The customer may subsequently begin a checkout process 821 after completion of the configuration operation 819. When checkout operation 821 is completed, the configurator 107 will send the checkout configurator access code message 823 to the customer configuration database 109, and the customer configuration database 109 will send a status inquiry 825 to the card activator 105. The card activator 105 will send the validity confirmation message 827 to the customer configuration database 109, and the customer configuration database 109 will redeem the configurator access code as shown by message 829. The card activator 105 will mark the configurator access code redeemed and send a message 831 to the customer configuration database 109. The customer configuration database 109 will send the configurator access code redeemed message 833 to the configurator 107 and configurator 107 will complete the checkout operation 835 as shown.

Therefore methods and systems have been disclosed that use a virtual SKU that serves as a placeholder for a not yet assembled, configurable mobile device. A customer receives the virtual SKU as a virtual SKU card, or in a printout format, or as an email or other electronic message format. The customer uses a configurator access code associated with the virtual SKU to configure and customize a mobile device which is then assembled to order at a factory and shipped to the customer. Various advantages are realized by the disclosed methods and systems with one advantage being reduction of inventory burden on network service providers and third party retailers. Other advantages will be apparent to those of ordinary skill in view of the above detailed description and the example embodiments provided therein.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method to configure customizable mobile devices, comprising:
receiving, by a configurator and from a retail point-of-sale computing system, a notification of a sale of a customizable mobile device to a user, the notification of the sale comprising a stock-keeping-unit activation request and user identification information, the stock-keeping-unit activation request corresponding to a stock-keeping-unit identifier for the customizable mobile device, wherein the customizable mobile device has not yet been assembled by a manufacturing system;
authenticating, by the configurator, the stock-keeping-unit activation request;
in response to authenticating the stock-keeping-unit activation request, activating, by the configurator, the stock-keeping-unit identifier that corresponds to the authenticated stock-keeping-unit activation request;
transmitting, by the configurator, an activation confirmation to the point-of-sale computing system, the activation confirmation comprising a configuration access code;
receiving, by the configurator and after completion of the sale of the customizable mobile device that has not yet been assembled by the manufacturing system, a mobile device configuration request that corresponds to the activated stock-keeping-unit identifier and the configuration access code for the customizable mobile device that has not yet been assembled, the mobile device configuration request comprising one or more mobile device options selected by the user for the customizable mobile device that has not yet been assembled by the manufacturing system;
generating, by the configurator, a bill of material in response to receiving the configuration request; and
transmitting, by the configurator, the bill of material to the manufacturing system instructing assembly of the customized mobile device in accordance with the one or more mobile device options selected by the user for the customizable mobile device and information associated with the stock-keeping-unit, wherein the manufacturing system assembles the customized mobile device in accordance with the bill of material instructing assembly of the customized mobile device.

2. The method of claim 1, further comprising shipping the customized mobile device to the customer.

3. The method of claim 1, further comprising associating, by the configurator, the stock-keeping-unit identifier with a mobile device identification number, wherein the customized mobile device is programmed with the mobile device identification number.

4. The method of claim 3, wherein programming the mobile device with the mobile device identification number, comprises programming the mobile device with one of an electronic serial number (ESN), an International Mobile Equipment Identity (IMEI), or a Mobile Equipment Identifier (MEID) as the mobile device identification number.

5. The method of claim 1, further comprising associating, by the configurator, the user identification information with the stock-keeping-unit identifier.

6. The method of claim 1, further comprising:
receiving, by the configurator and from the point-of-sale computing system, a refund request, the refund request comprising the stock-keeping-unit identifier; and
deactivating, by the configurator, the stock-keeping-unit identifier.

7. The method of claim 6, wherein the refund request further comprises a stock-keeping-unit identifier status request.

8. The method of claim 7, further comprising verifying, by the configurator, that the stock-keeping-unit identifier had been activated.

9. A system to configure customizable mobile devices, comprising:
- a storage device; and
- a processor communicatively coupled to the storage device, wherein the processor executes application code instructions that are stored in the storage device to cause the system to:
  - receive a notification of a sale of a customizable mobile device to a user from a retail point-of-sale computing system, the notification of the sale comprising a stock-keeping-unit activation request and user identification information, the stock-keeping-unit activation request corresponding to a stock-keeping-unit identifier for the customizable mobile device, wherein the customizable mobile device has not yet been assembled by a manufacturing system;
  - authenticate the stock-keeping-unit activation request;
  - activate the stock-keeping-unit identifier that corresponds to the authenticated stock-keeping-unit activation request;
  - transmit an activation confirmation to the point-of-sale computing system;
  - receive, after completion of the sale of the customizable mobile device that has not yet been assembled by the manufacturing system, a mobile device configuration request that corresponds to the stock-keeping-unit identifier for the customizable mobile device that has not yet been assembled, the mobile device configuration request comprising one or more mobile device options selected by the user for the customizable mobile device that has not yet been assembled by the manufacturing system;
  - generate a bill of material in response to receiving the configuration request; and
  - transmit the bill of material to the manufacturing system instructing assembly of the customized mobile device in accordance with the one or more mobile device options selected by the user for the customizable mobile device and information associated with the stock-keeping-unit, wherein the manufacturing system assembles the customized mobile device in accordance with the bill of material instructing assembly of the customized mobile device.

10. The system of claim 9, wherein the processor is further configured to execute computer-executable instructions stored in the storage device to cause the system to associate the stock-keeping-unit identifier with a mobile device identification number, wherein the customized mobile device is programmed with the mobile device identification number.

11. The system of claim 9, wherein the processor is further configured to execute computer-executable instructions stored in the storage device to cause the system to associate the user identification information with the stock-keeping-unit identifier.

12. The system of claim 9, wherein the processor is further configured to execute computer-executable instructions stored in the storage device to cause the system to:
- receive a refund request from the point-of-sale computing system, the refund request comprising the stock-keeping-unit identifier and a stock-keeping-unit identifier status request;
- verify that the stock-keeping-unit identifier had been activated; and
- deactivate the stock-keeping-unit identifier.

13. The system of claim 9, wherein the activation confirmation comprises a configuration access code and the user enters the configuration access code when selecting the one or more mobile device options for the customizable mobile device in the configuration request.

* * * * *